US009772962B2

(12) United States Patent
Tsirkin et al.

(10) Patent No.: US 9,772,962 B2
(45) Date of Patent: Sep. 26, 2017

(54) MEMORY SHARING FOR DIRECT MEMORY ACCESS BY A DEVICE ASSIGNED TO A GUEST OPERATING SYSTEM

(71) Applicant: Red Hat Israel, Ltd., Raanana (IL)

(72) Inventors: Michael Tsirkin, Raanana (IL); Andrea Arcangeli, Imola (IT)

(73) Assignee: Red Hat Israel, Ltd., Raanana (IL)

( * ) Notice: Subject to any disclaimer, the term of this patent is extended or adjusted under 35 U.S.C. 154(b) by 209 days.

(21) Appl. No.: 14/724,308

(22) Filed: May 28, 2015

(65) Prior Publication Data
US 2016/0350244 A1    Dec. 1, 2016

(51) Int. Cl.
*G06F 13/28*    (2006.01)
*G06F 3/06*    (2006.01)

(52) U.S. Cl.
CPC ............ *G06F 13/28* (2013.01); *G06F 3/0604* (2013.01); *G06F 3/0634* (2013.01); *G06F 3/0664* (2013.01); *G06F 3/0673* (2013.01)

(58) Field of Classification Search
CPC ...... G06F 13/28; G06F 3/0604; G06F 3/0634; G06F 3/0664
See application file for complete search history.

(56) References Cited

U.S. PATENT DOCUMENTS

| | | | |
|---|---|---|---|
| 7,421,533 B2 | 9/2008 | Zimmer et al. | |
| 7,613,898 B2 | 11/2009 | Haertel et al. | |
| 7,702,826 B2 | 4/2010 | Oztaskin et al. | |
| 7,840,765 B2 | 11/2010 | VelurEunni | |
| 7,849,272 B2 | 12/2010 | Kalmuk et al. | |
| 7,984,108 B2 | 7/2011 | Landis et al. | |
| 8,001,543 B2 | 8/2011 | Wooldridge et al. | |
| 8,392,628 B2 | 3/2013 | Santos et al. | |
| 8,645,611 B2 | 2/2014 | Tian | |
| 8,892,788 B2 | 11/2014 | Tsirkin | |
| 8,954,959 B2 | 2/2015 | Tsirkin et al. | |
| 2008/0040565 A1* | 2/2008 | Rozas | G06F 12/145 711/163 |
| 2008/0201540 A1 | 8/2008 | Sahita et al. | |
| 2009/0037680 A1* | 2/2009 | Colbert | G06F 3/0617 711/162 |
| 2011/0202919 A1* | 8/2011 | Hayakawa | G06F 9/45558 718/1 |

(Continued)

OTHER PUBLICATIONS

Abel Gordon; Towards Exitless and Efficient Paravirtual I/O; IBM Research—Hafia; Jun. 4, 2012; http://www.mulix.org/pubs/eli/elvis-systor12.pdf.

(Continued)

*Primary Examiner* — Glenn A Auve
(74) *Attorney, Agent, or Firm* — Lowenstein Sandler LLP (57) ABSTRACT

A guest operating system (OS) detects a direct memory access (DMA) write request for a device assigned to a guest OS to perform a DMA write to a page of memory and, prior to a write access of to the page, sets a DMA write state of a guest physical address for the requested page of memory to indicate that a DMA write operation is in progress for the requested page. The guest OS causes a virtual central processing unit (CPU) to attempt to write to the requested page of memory and sends the DMA write request to the device to cause the device to write to the requested page of memory.

20 Claims, 6 Drawing Sheets

(56) References Cited

U.S. PATENT DOCUMENTS

| | | |
|---|---|---|
| 2012/0072906 A1 | 3/2012 | Tsirkin et al. |
| 2012/0216188 A1 | 8/2012 | Tsirkin |
| 2013/0013877 A1 | 1/2013 | Tian |
| 2013/0031293 A1 | 1/2013 | Van Riel |
| 2013/0061020 A1 | 3/2013 | Koob et al. |
| 2013/0145051 A1 | 6/2013 | Kegel et al. |
| 2013/0145055 A1 | 6/2013 | Kegel et al. |
| 2013/0322335 A1 | 12/2013 | Smith |
| 2014/0068137 A1 | 3/2014 | Kegel et al. |
| 2015/0006783 A1 | 1/2015 | Chew |
| 2015/0261616 A1 | 9/2015 | Lim et al. |
| 2015/0378641 A1* | 12/2015 | Franke .................. G06F 3/0664 710/74 |
| 2016/0162316 A1 | 6/2016 | King |

OTHER PUBLICATIONS

TW Burger; Intel® Virtualization Technology for Directed I/O (VT-d): Enhancing Intel Platforms for Efficient Virtualization of I/O Devices; Mar. 5, 2012.
VirtDriver Guest CPU Memory Placement; https://wiki.openstack.org/wiki/VirtDriverGuestCPUMemoryPlacement.
U.S. Appl. No. 14/724,318, Non-Final Office Action mailed Sep. 21, 2016, 8 pages.
U.S. Appl. No. 14/724,318, Notice of Allowance mailed Mar. 24, 2017, 13 pages.

* cited by examiner

Splitting Pages

FIG. 3
Combining Pages

MEMORY SHARING FOR DIRECT MEMORY ACCESS BY A DEVICE ASSIGNED TO A GUEST OPERATING SYSTEM

TECHNICAL FIELD

The present disclosure relates to memory sharing, and more particularly, to memory sharing for direct memory access by a device assigned to a guest operating system.

BACKGROUND

Direct memory access (DMA) allows hardware devices in a computer to access system memory for reading and/or writing independently of the central processing unit (CPU). Hardware devices that are capable of performing DMA include disk drive controllers, graphics cards, network cards and sound cards. While a hardware device is performing the DMA, the CPU can engage in other operations. DMA is especially useful in real-time computing applications where it is critical to avoid the stalling of concurrent operations.

A computer having DMA-capable devices often uses an input/output memory management unit (IOMMU) to manage address translations. In a virtual machine system, the guest operating system of a virtual machine usually does not know the host physical address that it accesses. Instead, the virtual machine system operates using virtualized guest physical addresses. Typically, multiple virtual machines share the same memory for reading the same data. The memory can be write protected to prevent the virtual machines from writing to the shared memory. When a virtual machine attempts to modify the shared memory, a page fault is typically triggered to cause a copy of the memory to be created, which the virtual machine can use to make a modification. With conventional DMA systems, if a device is assigned to a guest operating system of a virtual machine and attempts to modify shared memory, a page fault is typically not triggered and an error can occur. Most devices in traditional DMA system cannot recover from such errors and handling the error recovery in real time incurs significant overhead that degrades the performance of the system.

BRIEF DESCRIPTION OF THE DRAWINGS

The present disclosure will be understood more fully from the detailed description given below and from the accompanying drawings of various implementations of the disclosure.

DETAILED DESCRIPTION

Implementations of the present disclosure describe memory sharing for direct memory access by a device assigned to a guest operating system. A computer system hosts one or more virtual machines. Each virtual machine hosts a virtual CPU (central processing unit), a guest operating system (OS), and is allocated virtual memory. The virtual memory can be mapped to physical host memory in the computer system. The computer system runs a hypervisor to virtualize access to the underlying host hardware (e.g., host memory), making the use of the virtual machines transparent to the guest operating systems and the user of the computer system. The computer system allows memory overcommit, which allows the assignment of more virtual memory to virtual computing devices than the physical memory that is in the computer system. Memory sharing is used for managing memory overcommit. The hypervisor identifies identical pages of virtual memory and modifies mappings to point to a single shared page to free up the other pages that contained the identical data in the host memory for other use. The shared page may be write-protected and when an attempt is made to write to the shared page, a page fault is triggered, which causes a copy of the shared page to be created for the write operation. With conventional systems, a device may be assigned to a guest OS and attempt to write to a shared page by direct memory access (DMA) that is write protected. Typically, a copy of the shared page is created and separate copies are provided to each virtual machine.

Implementations of the present disclosure allow DMA write access by a device assigned to a guest OS for write protected pages. Implementations of the present disclosure include a guest OS that detects a DMA write request for a device to perform a DMA write to a page of memory. Prior to writing to the page, the guest OS sets a DMA write state for the requested page to indicate that there is a DMA write operation in progress for the requested page, and that the request page should not be combined with another page if requested. The "combining" of pages hereinafter refers to identifying identical pages, and sharing one of the identical pages by and modifying mappings to point to the shared page to free up the other pages for other purposes.

The guest OS then causes a virtual CPU to write to the requested page and sends the DMA write request to the device. If the requested page is write protected, implementations of the present include a hypervisor that detects the page fault and creates a copy of the requested page for the write operation for the device. The hypervisor also can combine identical pages. The hypervisor identifies pages that have matching data and checks the DMA write state for a page having matching data to determine if there is DMA write operation in progress for the page. If there is no DMA write operation in progress, the hypervisor modifies mappings to point to a single shared page and frees up host memory of the other pages.

Figure 1:
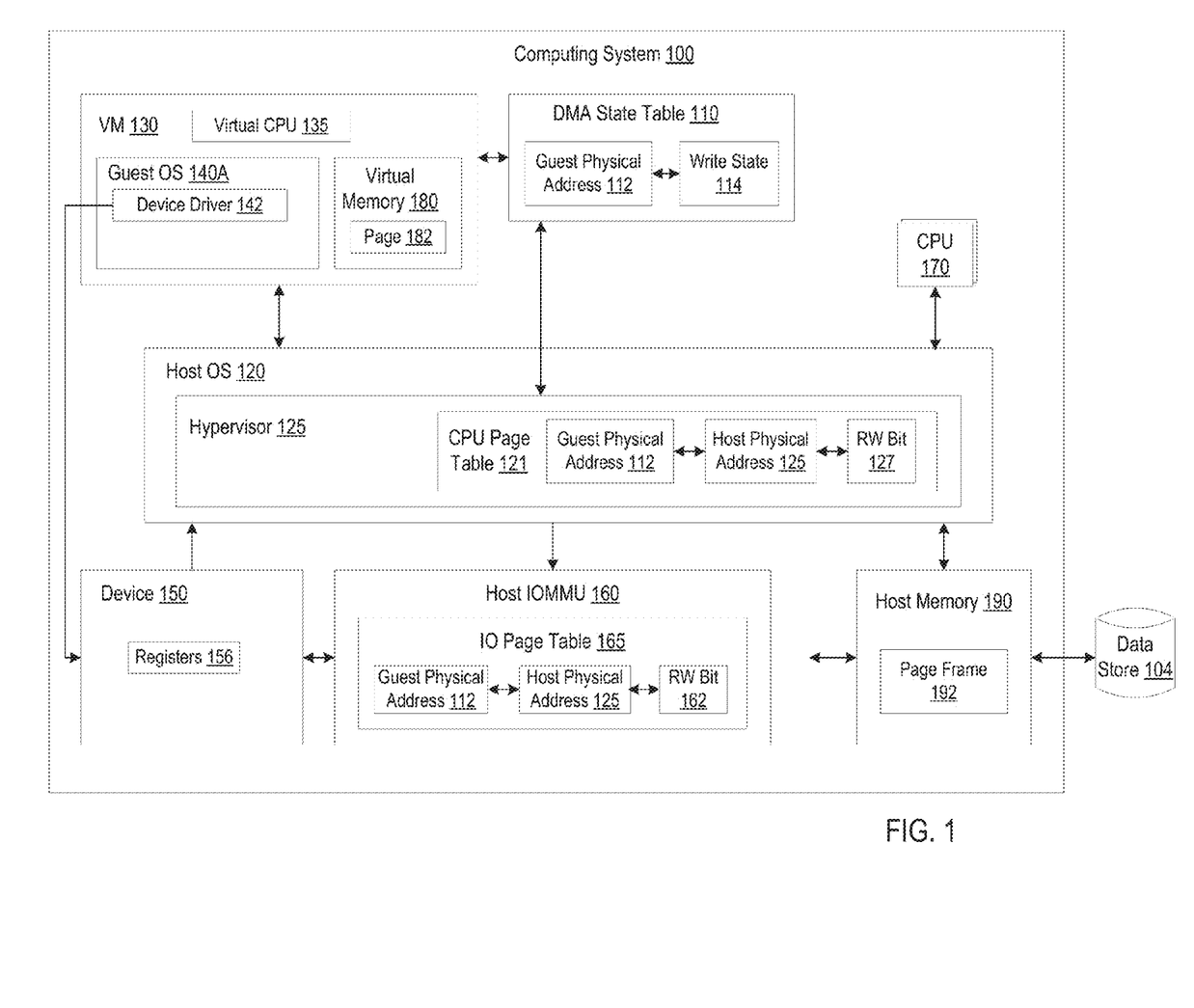
FIG. 1 illustrates an example system architecture, in accordance with various implementations.

FIG. 1 is an example computer system 100 in accordance with one or more implementations of the present disclosure. The computer system 100 can host one or more virtual machines (VM) 130. Each virtual machine 130 runs a guest operating system (OS) 140. The virtual machines 130 may have the same or different guest operating systems 140. The computer system 100 may be a server computer, a desktop computer, a set-top box, a portable computing device such as, and not limited to, netbooks, laptop computers, an electronic book reader, and the like.

The computer system 100 runs a host OS 120 to manage system resources. In one implementation, the computer system 100 runs a hypervisor 125 to virtualize access to the underlying host hardware, making the use of the virtual machine 130 transparent to the guest operating systems 140 and the user of the computer system 100. In some implementations, the hypervisor 125 may be part of the host OS 120. The computer system 100 includes hardware components such as one or more physical central processing units (CPUs) 170, memory 190 (also referred to as "host memory", "host physical memory", or "physical memory") and other hardware components. There can be more than one CPU 170. A CPU 170 can be a multi-core processor and each core of a CPU 170 can be used to assign a virtual CPU 135 to a virtual machine 130.

The computer system 100 includes one or more devices 150 (also referred to as "physical devices," for example, audio/video devices, network interface devices, printers, graphics modules, etc.) that are capable of performing direct memory access (DMA) transactions. For simplicity of the illustration, only one device 150 is shown. It is understood that the computer system 100 may include any number of devices.

System 100 includes physical host memory 190 (main memory), such as volatile memory (e.g., random access memory (RAM)). The host memory 190 is memory that is actually present in the computing system 100 and has physical addresses (host physical addresses). Each virtual machine 130 can be assigned virtual memory 180 that contains a virtual address space that is mapped to host memory 190. The host memory 190 can be addressed by the physical devices (e.g., the device 150). The host memory 190 is distinguishable from virtual memory 180, which is addressed by the guest OS 140. Virtual memory 180 is a virtual address space having virtual addresses (hereinafter also referred to as "guest physical addresses"). The guest physical addresses are in the virtual address space of the virtual memory 180 that is assigned to the guest OS 140 and are considered by the guest OS 140 to be its physical address space. The host physical addresses are in the physical address space of the host memory 190 and can be used to access the host memory 190.

The physical address space for the host memory 190 is divided into equal-sized pieces called page frames 192. The page frames 192 of the host memory 190 are accessible by corresponding host physical addresses. For simplicity of the illustration, only one page frame 192 is shown. It is understood that the host memory 190 may include any number of page frames.

A virtual address space is divided into equal-size pieces called pages 182 and are accessible by corresponding guest physical addresses. For simplicity of the illustration, only one page 182 is shown. It is understood that the virtual memory 180 may include any number of pages. A "page," "memory page," or "virtual page" is a fixed-length contiguous block of virtual memory 180 described by a single entry in a CPU page table 121 in the hypervisor 125. A CPU page table 121 is a data structure to store the mappings between guest physical addresses 112 and host physical addresses 125. The CPU page table 121 can keep track of the pages that are resident in the host memory 190. The CPU page table 121 can include page table entries for the range of guest physical addresses that is allocated to a guest OS 140. Each mapping between a guest physical address 112 to a host physical address 125 can include a read/write (RW) bit 127 for each page to indicate the type of access that is permitted for the page that corresponds to the guest physical address 112. In one implementation, the RW bit 127 is represented by one or more bits.

The computer system 100 may also be coupled to one or more data stores 104. The data stores 180 can be secondary storage to the host memory 190. The data store 104 can be a persistent storage that is capable of storing data. A persistent storage can be a local storage unit or a remote storage unit. Persistent storage can be disk, a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

The computer system 100 can support over-commitment of memory, where the virtual address space allocated to the virtual machines 130 exceeds the available physical address space in the computer system 100. With a virtual address space, the system 100 can identify pages 182 that have identical data and consolidate pages to a single shared page by modifying mappings to point to point to the single shared page of the data to free up space in the host memory 190 to load data for other pages 182 into the host memory 190 and can emulate an unlimited host memory 190 space even though system 100 may have limited physical host memory 190 installed.

A device 150 can be assigned to a guest OS 140, and the guest OS 140 can include a device driver 142 for the device 150. A device 150 can support direct memory access (DMA) to transfer its I/O data directly to and from the host memory 190 without the need to involve the CPU 170. The device 150 performs DMA using a DMA buffer. The DMA buffer is in the address space allocated to one of the virtual machines 130. The DMA buffer can be used by the device 150 to directly transfer input data to the virtual machine 130 and/or directly transfer output data from the virtual machine 130. In traditional DMA systems, only a portion of the virtual memory 180 for a guest OS 140 is accessible to a device 150 for DMA, and the bus addresses for the portion of virtual memory 180 for DMA are generally stored in registers 156.

Generally, when a device 150 attempts to access the host memory 190, the host IOMMU 160 translates the bus address into a host physical address. In conventional DMA systems, since only a portion of virtual memory 180 is used for DMA, the host IOMMU 160 is updated when the portion of virtual memory 180 for DMA changes. Conventional DMA systems incur system and resource overhead by exiting to the hypervisor 125 to update the host IOMMU 160 translations.

Unlike conventional DMA systems, implementations of the present disclosure allocate all of the virtual memory 180 for a guest OS 140 to be accessible to the device 150 for DMA. The DMA buffer spans all of the pages 182 in the virtual memory 180. All of the guest physical addresses for the virtual machine 130 can be passed to the device driver 142 and programmed by the device driver 142 into the device registers 156 as the addresses of the DMA buffer. For simplicity of discussion, only one guest physical address being used as a bus address is described. It is understood that a DMA transaction may involve multiple guest physical addresses to be used as bus addresses.

Implementations of the present disclosure include a host IOMMU 160 to implement an IOMMU page table 165 and a one-time translation of the guest physical addresses 112 of the pages of the virtual address space to the host physical addresses 125 of the physical page frames of the host memory 190. The host IOMMU 160 can be a separate component from the device 150 or may be located within the device 150. The IOMMU page table 165 is a one-time mapping of all of the guest physical addresses 112 to the host physical addresses 125. With all of the guest physical addresses 112 mapped to the host physical addresses 125, there is no change in the mapping, which results in no need to further update the mappings in IOMMU page table 165 or in the CPU page table 121, which reduces the overhead conventionally incurred for exiting the to the hypervisor 125 to perform the updates. In one implementation, there is no IOMMU page table 165, and the processor architecture supports the host IOMMU 160 having a redirected table to use the CPU page table 121.

Each mapping in the IOMMU page table 165 between a guest physical address 112 to a host physical address 125 can include a read/write (RW) state 162 for each page to indicate the type of access (e.g., read only, read/write, write only) is permitted for the page that corresponds to the guest physical address 112. In one implementation, the RW state 162 is represented by one or more bits.

Unlike traditional DMA systems that do not support page faults for DMA by a device 150 that is assigned to a guest OS 140, implementations of the present disclosure include a guest OS 140 to support DMA by the device 150, even for a requested page 182 that is write-protected. The device driver 142 can receive a DMA write request, for example from an application or process running the virtual machine 130, to write to a page 182 at a particular page guest physical address. The guest OS 140 can detect the DMA write request, and can set the DMA write state for the requested page in a DMA state table 110. The guest OS 140 can create and maintain a DMA state table 110 for each virtual machine 130 to track which pages 182 in the virtual memory 180 for the particular virtual machine 130 have a DMA write operation that is in progress. The DMA state table 110 can include the guest physical addresses 112 of the pages 182 in the virtual memory 180 for the particular guest OS 140, and a write state 114 for each guest physical address 112. In one implementation, the write state 114 is represented by one or more bits. In one implementation, the write state 114 is represented by a counter or a count, which may monitor different parts of the same page for DMA simultaneously from two different devices. In one implementation, the counter is a bit (e.g., 0 or 1). In one implementation, the counter is an integer or long (e.g., 32 or 64 bit).

The write states 114 can indicate which pages 182 have a DMA write operation in progress. In one implementation, a write state 114 that is enabled (e.g., set to a one value) indicates that there is a DMA write operation in progress for the page 182 is in host memory 190 and should not be combined with another page if requested. In one implementation, a write state 114 that is disabled (e.g., set to zero value) indicates that there is no DMA write operation that is in progress for the page 182 and that the page 182 can be combined with another page if requested.

Before the DMA write request is sent to the device 150, the guest OS 140 causes the virtual CPU 135 to write to the page at the requested page guest physical address, and then sends the DMA write request to the device 150. If the requested page is not write protected, there is no exit to the hypervisor 125 and the device 150 can use the mapping in the IOMMU page table 165 to write to the requested page in the host memory 190.

If the requested page is write protected, a page fault is triggered by the virtual CPU's attempt to write to the requested page, and the hypervisor 125 can take control to create a copy of the requested page for the DMA write operation. Unlike traditional DMA systems, implementations of the present disclosure include a hypervisor 125 that can combine pages that have identical data to free up host memory. The hypervisor identifies pages that matching data and checks the DMA state table 110 for a page having the identical data to determine whether there is a DMA write operation that is in progress for the page. If there is not a DMA write operation that is in progress, the hypervisor combines the pages, as described in greater detail below.

Figure 2:
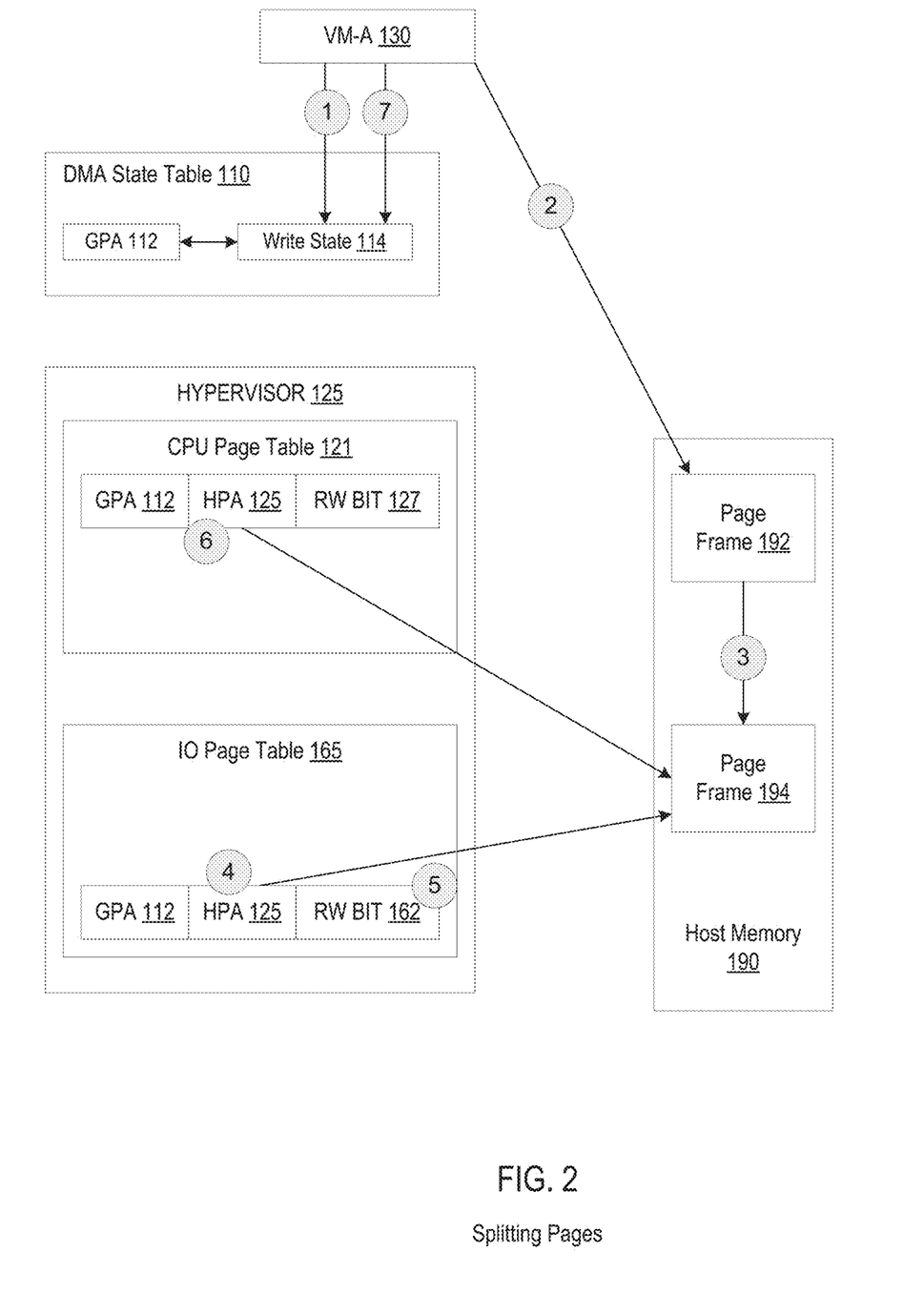
FIG. 2 is a block diagram illustrating an example of splitting a page for a write operation by DMA by a device assigned to a guest operating system, in accordance with one or more implementations of the present disclosure.

FIG. 2 is a block diagram illustrating an example of splitting a page for a write operation by DMA by a device assigned to a guest operating system, in accordance with one or more implementations of the present disclosure. The guest OS of virtual machine A (VM-A) 130 detects a DMA write request to write to virtual memory at a particular guest physical address (GPA) 112. The GPA 112 is mapped to page frame 192 in host memory 190. The guest OS sets (reference 1) the write state 114 for the GPA 112 in the DMA state table 110 for VM-A 130 to indicate that there is a DMA write operation in progress and that the data at GPA 112 should not be combined with another page of memory if requested. The guest OS causes the virtual CPU of the VM-A 130 to attempt to write (reference 2) to GPA 112 at page frame 192. The guest OS then sends the DMA write request to the device.

The page frame 192 is write-protected and the virtual CPU's attempt to write to the page frame 192 triggers a page fault. The hypervisor 125 detects the page fault and copies (reference 3) the data at page frame 192 to page frame 192 in host memory 190. The hypervisor 125 updates (reference 4) the mapping in the IOMMU page table 165 to have GPA 112 point to the host physical address (HPA) 125 for page frame 194. The hypervisor 125 sets (references 5) the read/write (RW) bit 127 for write access to make page frame 194 writeable. The hypervisor 125 updates the mapping in the CPU page table 121 to also have GPA 112 point to HPA 125 for page frame 194.

After the device completes the DMA write operation, the guest OS changes (reference 7) the DMA write state for GPA 112 in the DMA state table 110 to indicate that there is no DMA write operation in progress for GPA 112 and that the data at GPA 112 can be combined if requested.

Figure 3:
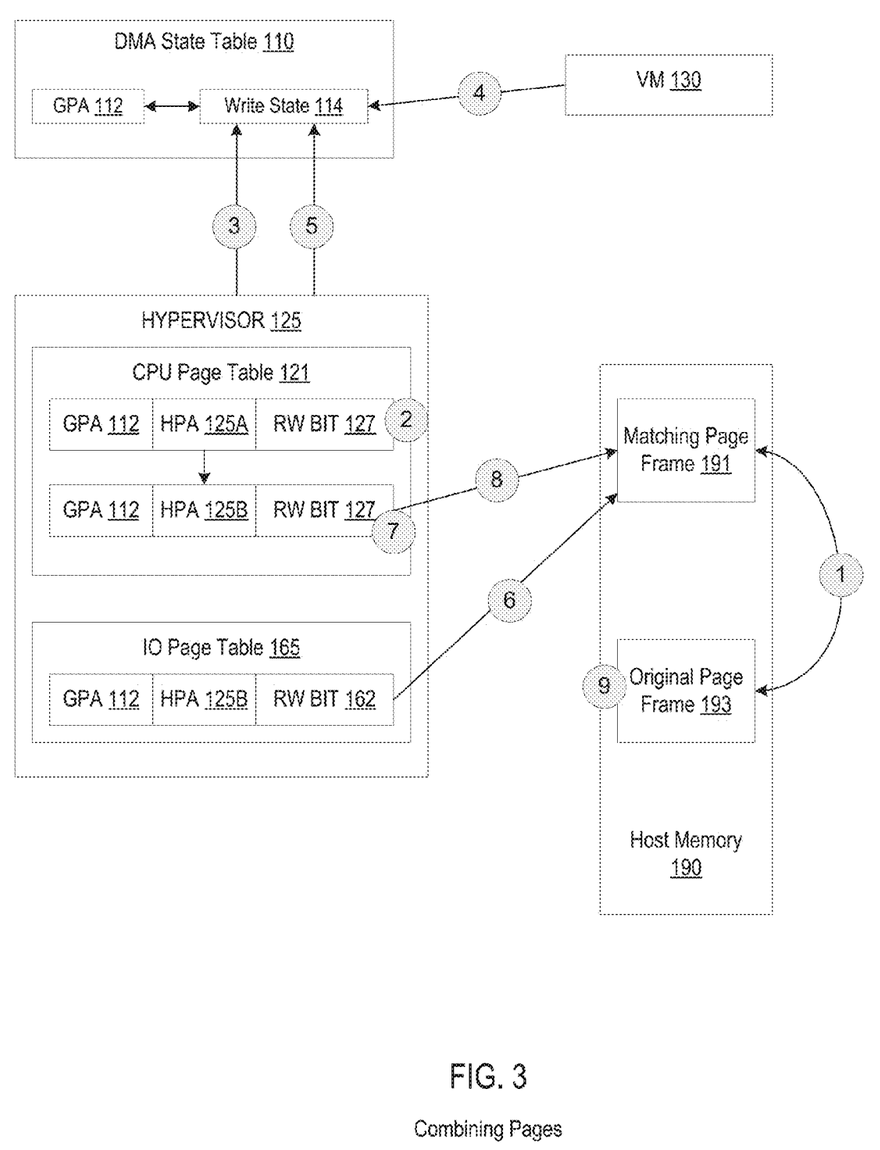
FIG. 3 is a block diagram illustrating an example of combining pages and DMA by a device assigned to a guest operating system, in accordance with one or more implementations of the present disclosure.

FIG. 3 is a block diagram illustrating an example of combining pages and DMA by a device assigned to a guest operating system, in accordance with one or more implementations of the present disclosure. The hypervisor 125 may initially have original mappings in the CPU page table 121 and the IOMMU page table 165 for guest physical address (GPA) 112A pointing to a page at original page frame (e.g., original page frame 193). The hypervisor 125 detects (reference 1) that the page at matching page frame 191 is identical to the page at the original page fame 194. The pair of identical pages (e.g., page at original page frame 193 and page at matching page frame 191) are candidates for combining, where the hypervisor may change the mappings in the CPU page table 121 and the IOMMU page table 165 for GPA 112A to point to the page at the matching page frame 191 and allow the page at the original page frame 193 to be re-used for another purpose. An "original page frame" (e.g., original page frame 193) hereinafter refers to the page frame that is mapped in the page tables for a particular guest physical address. A "matching page frame" (e.g., matching page frame 191) hereinafter refers to a page frame that has a page of data that is identical to the page of data at the original page frame (e.g., original page frame 193).

To perform the combining of the pages, the hypervisor 125 write-protects (reference 2) the page at page frame 193 in a CPU page table 121 to prevent a guest OS from modifying the page at page frame 193. The hypervisor 125 checks (reference 3) the DMA write state 114 for the GPA 112 that is mapped to page frame 191 to determine if there is DMA write operation that is in progress for the page at page frame 191. If there is a DMA write operation in progress for the page at page frame 191, then the hypervisor 125 does not combine the page at page frame 191 with the page at page frame 193. There may be a DMA write operation in progress for the page at page frame 191, and when the DMA write operation is complete, the guest OS at virtual machine 130 can change (reference 4) the write state 114 to indicate that there is no write operation in progress for the page at page frame 191.

The hypervisor 125 can re-check (reference 5) the DMA write state 114 for the GPA 112 that is mapped to page frame 191 and determine that there is no DMA write operation in progress for the page at page frame 191. An optional optimization alternative to the hypervisor 125 re-checking the DMA write state 114 is described in greater detail below in conjunction with FIG. 5. Referring to FIG. 3, the hypervisor 125 then modifies (reference 6) the IOMMU page table 165 to point to the HPA 125 for page frame 191, and sets (reference 7) the RW bit 127 for page frame 191 in the CPU page table 121 to read only to prevent the device from modifying the page frame 191 that is being combined with page frame 193. The hypervisor 125 updates (reference 8) the mapping in the CPU page table 121 to also point to page frame 191. The re-mapping in the IOMMU page table 165 and the CPU page table 121 allows page frame 193 to be re-used for another purpose.

Figure 4:
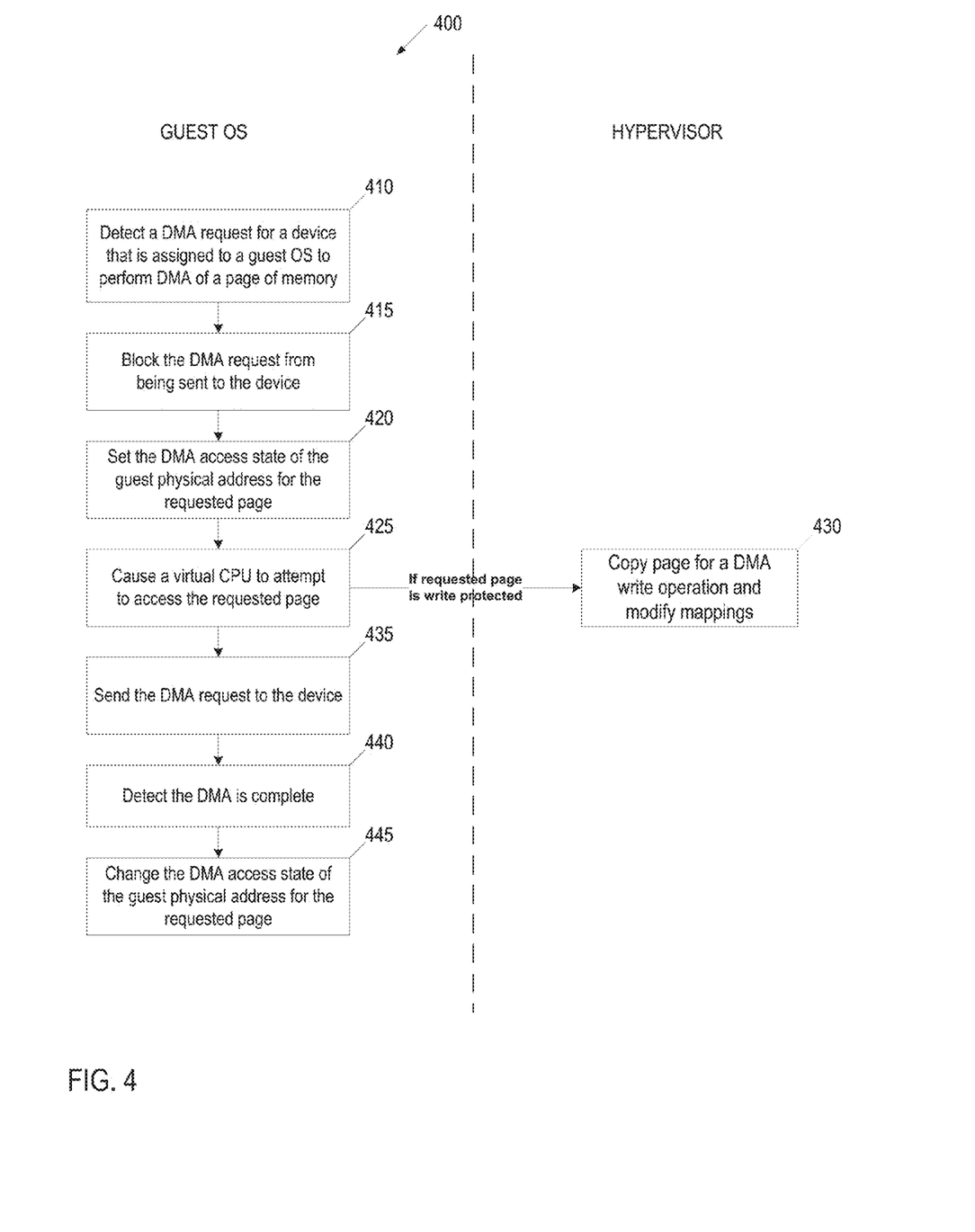
FIG. 4 is a flow diagram illustrating one implementation of a method for performing a DMA write by a device that is assigned to a guest operating system, in accordance with one or more implementations of the present disclosure.

FIG. 4 is a flow diagram illustrating one implementation of a method 400 for performing a DMA write by a device that is assigned to a guest operating system, in accordance with one or more implementations of the present disclosure. The method 400 may be performed by a computer system 600 of FIG. 6 that may comprise hardware (e.g., circuitry, dedicated logic, programmable logic, microcode, etc.), software (e.g., instructions run on a processing device), or a combination thereof. In one implementation, the method 400 is performed by a guest OS 140 of FIG. 1.

At block 410, the guest OS detects a DMA write request for a device assigned to a guest OS to perform DMA of a page of memory. The guest OS can monitor the device driver and detect that the device driver receives instructions, for example, from a process running in the virtual machine to perform a DMA write operation by the device that is assigned to the guest OS. The DMA write request can include a guest physical address for the requested page of memory.

At block 415, the guest OS blocks the DMA write request from being sent to the device. The guest OS can trap the device driver and obtain control to block the device driver from sending the DMA write request to the device. At block 420, the guest OS sets the DMA write state of the guest physical address for the requested page of memory to indicate that a DMA write operation is in progress for the requested page and should not be combined with another page if requested. In one implementation, the guest OS sets the write state to a value of one to indicate that there is DMA write operation in progress and that the page at the particular page frame should not be combined with another page at another page frame.

At block 425, the guest OS causes a virtual CPU to attempt to write to the requested page of memory at the particular guest physical address. If the page is write protected, the host OS triggers a page fault, the virtual CPU loses control, and at block 430, the host OS gives control to the hypervisor to create a copy of the page at another page frame in the host memory and to modify the mappings to point to the copy, as described in greater detail above in conjunction with FIG. 2. The hypervisor then restarts the virtual CPU, and control is returned to the virtual CPU.

At block 435, the guest OS sends the DMA write request to the device. The guest OS can return control the device driver to allow the device driver to send the DMA write request to the device. The device can receive the DMA write request and use an IOMMU page table to write to the page in the host memory for the DMA write request. The device can send the DMA write request to the host IOMMU that can determine whether a guest physical address, which is in a device's DMA write request, is set for write access in the IOMMU page table. If a DMA write request is made to a guest physical address that does not write access, the DMA request will be denied. If the guest physical address is set for write access, the host IOMMU grants the device the write request.

At block 440, the guest OS detects the DMA write operation is complete. The guest OS may receive a message from the device or the device driver indicating that the DMA write operation is complete. For example, the device can notify the device driver that the DMA write has completed, and the device driver forwards the notification to the guest OS.

At block 445, the guest OS changes the write state in the DMA state table for the guest physical address for the page associated with the completed DMA write operation to indicate that there is no DMA write operation in progress for the page, and to allow the page to be combined with another page if requested. In implementation, the guest OS sets the write state to a value of zero to indicate that the page can be combined with another page.

Figure 5:
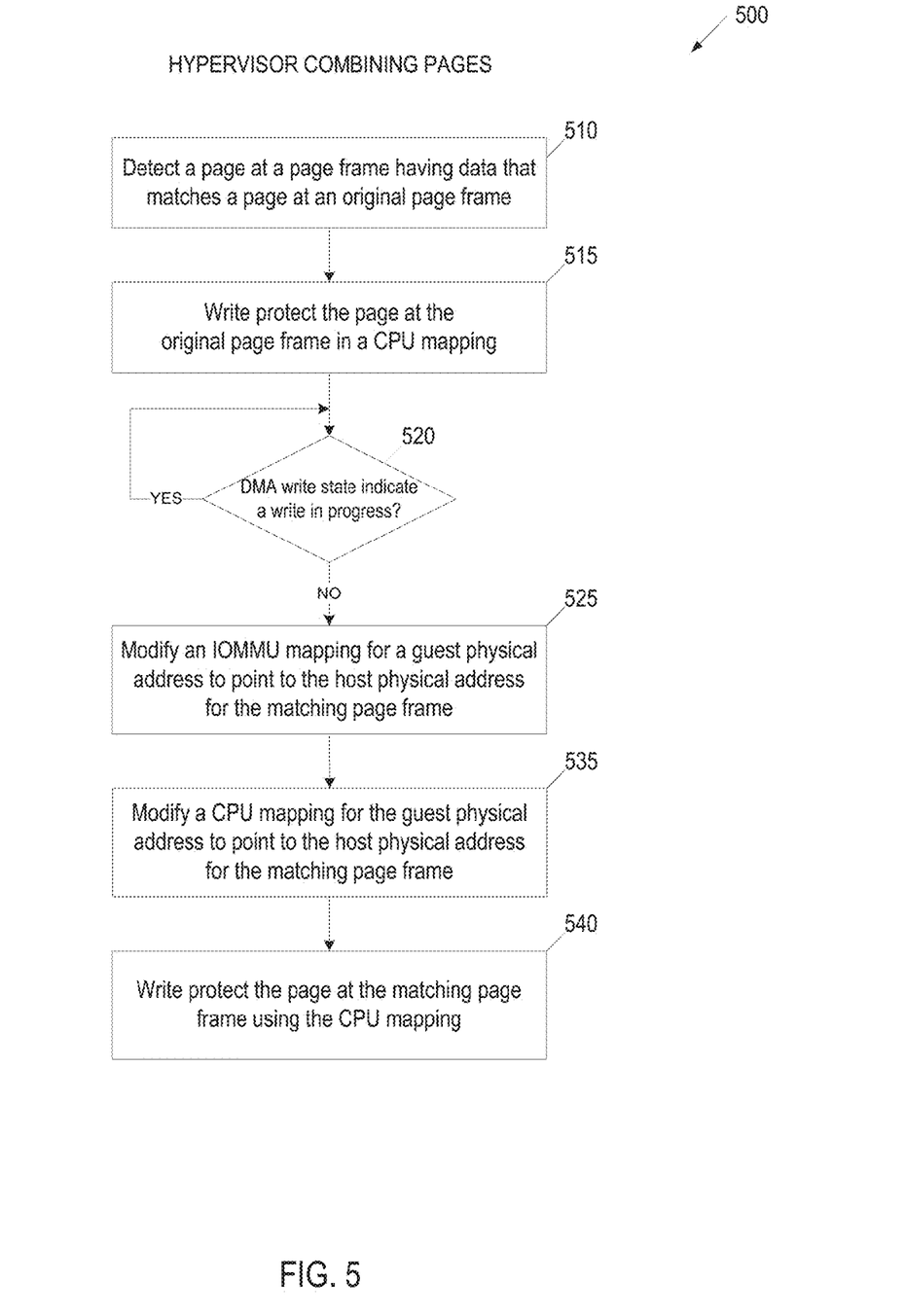
FIG. 5 is a flow diagram for a method for combining pages related to a device assigned to a guest operating system, in accordance with one or more implementations of the present disclosure.

FIG. 5 is a flow diagram for a method 500 for combining pages related to a device assigned to a guest operating system, in accordance with one or more implementations of the present disclosure. The method 500 may be performed by a computer system 600 of FIG. 6 that may comprise hardware (e.g., circuitry, dedicated logic, programmable logic, microcode, etc.), software (e.g., instructions run on a processing device), or a combination thereof. In one implementation, method 500 is performed by a hypervisor (e.g., hypervisor 125 of FIG. 1).

At block 510, the hypervisor detects a page at a page frame having data that matches the data of a page at an original page frame. The original page frame is a page frame that is has a mapping in a CPU page table and/or a IOMMU page table. The pair of identical pages are candidates for combining. For example, the hypervisor may initially have mappings in a CPU page table and an IOMMU page table for a guest physical address Z pointing to a page at an original page frame X, and the hypervisor can detect that a page at matching page frame Y has data that is identical to the data at the page at the original page frame X.

At block 515, the hypervisor write-protects the page in the original mapping at the original page frame X using a CPU mapping. The hypervisor can set a read/write state for the page to read only in the CPU page table. The write protection of the page prevents a guest OS from modifying the page at the original page frame X. At block 520, the hypervisor checks the DMA write state for the guest physical address that is mapped to matching page frame Y to determine if there is DMA write operation that is in progress for the page at the matching page frame Y. The hypervisor can read the DMA write state for the guest physical address that is mapped to matching page frame Y in a DMA state table. If the DMA write state is enabled (e.g., set to a one value), there is a write operation that is in progress. If the DMA write state is disable (e.g., set to a zero value), there is not a write operation that is in progress.

In one implementation, if there is a DMA write operation in progress (block 520), the hypervisor does not combine the page at the original page frame X with the page at the matching page frame Y and periodically re-checks the DMA write state until there is no write operation in progress. The hypervisor can re-check the DMA write state periodically using a user-defined and configurable period of time.

The hypervisor may not be able to combine the pages at the page frames for some time because there may one or more write operations in progress for the page at the matching page frame. As an optional optimization, the guest OS can perform a batch of DMA write operations and notify the hypervisor when the batch is complete to allow the hypervisor to perform a combining operation. In one implementation, the guest OS increments a counter for each time a DMA write state is changed. After a threshold number of changes is satisfied by the counter, the guest OS can notify the hypervisor that there are no write operations in progress. The hypervisor can then perform a combining operation. In one implementation, the guest OS increments a counter for each time a DMA write operation is completed. After a threshold number of DMA write operations being completed is satisfied by the counter, the guest OS can notify the hypervisor that there are no write operations in progress. The hypervisor can then perform a combining operation.

At block 525, the hypervisor modifies an IOMMU mapping for the guest physical address to point to the host physical address for matching page frame Y. The hypervisor modifies the mapping in an IOMMU page table.

At block 535, the hypervisor modifies a CPU mapping for the guest physical address to point to the matching page frame Y. The hypervisor can re-map the guest physical address in the CPU page table. The re-mappings of the CPU page table and IOMMU page table allows the original page frame X to be available to be re-used for another purpose. At block 540, the hypervisor write protects the page at the matching page frame in the CPU mapping. The hypervisor can set the read/write state for matching page frame Y in the CPU page table to read only. The write protection of the page at the matching page frame in the CPU mapping prevents the guest OS from modifying the matching page frame Y.

A page fault may occur when the hypervisor is modifying a mapping (e.g., IOMMU mapping, CPU mapping) because the guest OS may be attempting to write to the page at the matching page frame Y, which the hypervisor write-protected at block 530. The hypervisor cancel the combining method 500 to allow the guest OS write access to the page at the matching page frame Y. The hypervisor can perform the combination operations of method 500 when the write operation is complete by the guest OS.

Alternatively, the hypervisor can defer the guest OS attempt to write to the page at the matching page frame Y, and first complete the combining of the pair of pages. The guest OS can re-attempt to write to the page at the matching page frame Y. The write-protection of the page at the matching page frame Y at block 540 will trigger a page fault, which will cause the page at the matching page frame Y to be copied for the guest OS write operation.

Figure 6:
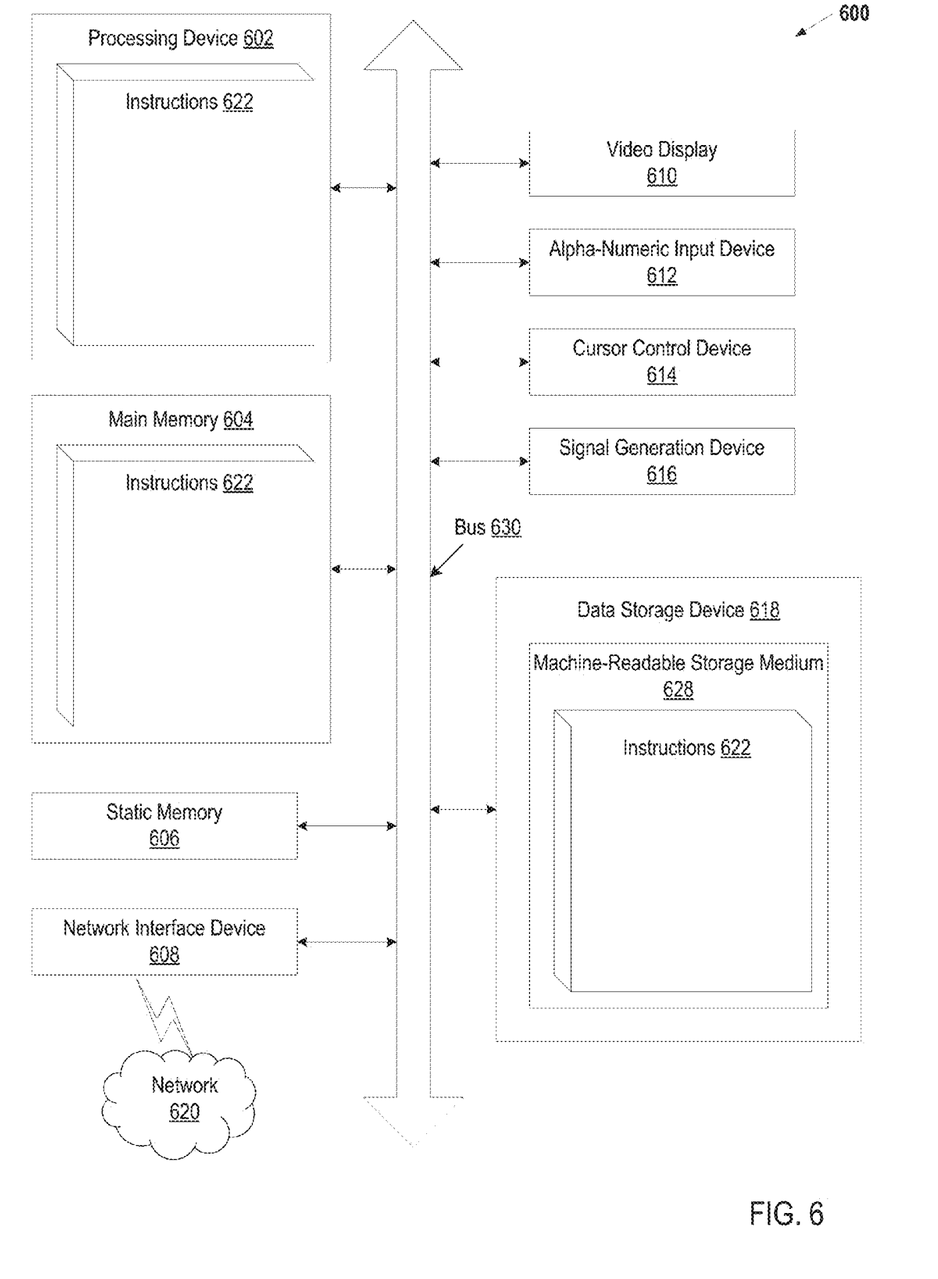
FIG. 6 is a block diagram of an example computer system that may perform one or more of the operations described herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data store device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT), an alphanumeric input device 612 (e.g., a keyboard), a cursor control device 614 (e.g., a mouse), and a signal generation device 616 (e.g., speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during during execution thereof by the computer system 600, the main memory 604 and the processing device 602 also constituting machine-readable storage media.

In one implementation, the instructions 622 include instructions for a guest operating system, and/or instructions for a hypervisor. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting" or "setting" or "causing" or "sending" or "incrementing" or "determining" or "notifying" or "changing" or "write protecting" or "checking" or "modifying" or "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    detecting a direct memory access (DMA) write request for a device assigned to a guest operating system to perform a DMA write to a page of memory;
    prior to a write access of the page, setting a DMA write state of a guest physical address for the requested page of memory to indicate that a DMA write operation is in progress for the requested page;
    causing, by a processing device, a virtual central processing unit (CPU) to attempt to write to the requested page of memory; and
    sending the DMA write request to the device to cause the device to write to the requested page of memory.

2. The method of claim 1, further comprising:
    incrementing a counter for each time a DMA write state is changed;
    determining a threshold number of changes is satisfied by the counter; and
    notifying a hypervisor to combine a plurality of pages in view of based on the threshold being satisfied.

3. The method of claim 1, further comprising:
    detecting a DMA write operation for the DMA write request is complete; and
    changing a state in a DMA state table for a guest physical address for the page associated with the DMA write operation to indicate that there is not a write operation in progress for the guest physical address.

4. The method of claim 1, further comprising:
    creating a DMA state table for a virtual machine corresponding to the guest operating system to monitor guest physical addresses of the virtual machine having a write operation in progress, wherein the DMA state table is stored in shared memory and accessible by a hypervisor.

5. The method of claim 1, wherein setting the DMA write state of the guest physical address to indicate that a DMA write operation is in progress for the requested page comprises:
    enabling a counter for the guest physical address in a DMA state table of a virtual machine corresponding to the guest operating system.

6. The method of claim 1, wherein setting the DMA write state of the guest physical address to indicate that a DMA write operation is in progress for the requested page comprises:

enabling a bit for the guest physical address in a DMA state table of a virtual machine corresponding to the guest operating system.

7. The method of claim 1, wherein an entire virtual memory that is assigned to the guest operating system is allocated to the device for DMA.

8. A non-transitory computer-readable storage medium including instructions that, when executed by a processing device, cause the processing device to:
 detect a page at a matching page frame in host memory having data that matches data at a page at an original page frame in the host memory, wherein the original page frame has at least one mapping of a guest physical address pointing to a host physical address of the page at the original page frame;
 write protect the page at the original page frame using a central processing unit (CPU) mapping;
 check, by a hypervisor executing on the processing device, a direct memory access (DMA) write state for a guest physical address corresponding to the page at the matching page frame to determine whether or not there is a write operation in progress for the page at the matching page frame; and
 modify the at least one mapping of the guest physical address to point to a host physical address of the page at the matching page frame in response to determining that the DMA write state indicates that there is no write operation in progress.

9. The non-transitory computer-readable storage medium of claim 8, wherein the processing device is further to:
 modify an IOMMU (input/output memory management unit) mapping for the guest physical address to point to a host physical address for the page at the matching page frame when the DMA write state indicates there is no write operation in progress; and
 write protect the page at the matching page frame using a CPU mapping for the page at the matching page frame.

10. The non-transitory computer-readable storage medium of claim 8, wherein the processing device is further to:
 modify a CPU mapping for the guest physical address to point to a host physical address for the page at the matching page frame when the DMA write state indicates there is no write operation in progress.

11. The non-transitory computer-readable storage medium of claim 8, wherein to modify the at least one mapping comprises the processing device to:
 determine from the DMA write state that there is a write operation in progress; and
 receive a notification from a guest operating system that there are no write operations in progress.

12. The non-transitory computer-readable storage medium of claim 8, wherein to check the DMA write state to determine whether or not there is a write operation in progress for the page at the matching page frame comprises:
 reading a write state for the page at the matching page frame in a DMA state table for a virtual machine corresponding to the guest operating system, wherein the DMA state table is stored in shared memory accessible by the hypervisor.

13. The non-transitory computer-readable storage medium of claim 8, wherein an entire virtual memory that is assigned to the guest operating system is allocated to the device for DMA.

14. A system comprising:
 a memory;
 a processing device, operatively coupled to the memory to:
  detect a direct memory access (DMA) write request for a device assigned to a guest operating system to perform a DMA write to a page of memory;
  prior to write access of the page, set a DMA write state of a guest physical address for the requested page of memory to indicate that a DMA write operation is in progress for the requested page;
  cause a virtual central processing unit (CPU) to attempt to write to the requested page of memory; and
  send the DMA write request to the device to cause the device to write to the requested page of memory.

15. The system of claim 14, wherein the processing device is further to:
 increment a counter for each time a DMA write state is changed;
 determine a threshold number of changes is satisfied by the counter; and
 notify a hypervisor to combine a plurality of pages in view of the threshold being satisfied.

16. The system of claim 14, wherein the processing device is further to:
 detect a DMA write operation for the DMA write request is complete; and
 change a state in a DMA state table for a guest physical address for the page associated with the DMA write operation to indicate that there is not a write operation in progress for the guest physical address.

17. The system of claim 14, further comprising:
 creating a DMA state table for a virtual machine corresponding to the guest operating system to monitor guest physical addresses of the virtual machine having a write operation in progress, wherein the DMA state table is stored in shared memory and accessible by a hypervisor.

18. The system of claim 14, wherein setting the DMA write state of the guest physical address to indicate that a DMA write operation is in progress for the requested page comprises:
 enabling a counter for the guest physical address in a DMA state table of a virtual machine corresponding to the guest operating system.

19. The system of claim 14, wherein setting the DMA write state of the guest physical address to indicate that a DMA write operation is in progress for the requested page comprises:
 enabling a bit for the guest physical address in a DMA state table of a virtual machine corresponding to the guest operating system.

20. The system of claim 14, wherein an entire virtual memory that is assigned to the guest operating system is allocated to the device for DMA.

* * * * *

UNITED STATES PATENT AND TRADEMARK OFFICE
CERTIFICATE OF CORRECTION

PATENT NO. : 9,772,962 B2
APPLICATION NO. : 14/724308
DATED : September 26, 2017
INVENTOR(S) : Michael Tsirkin and Andrea Arcangeli

Page 1 of 1

It is certified that error appears in the above-identified patent and that said Letters Patent is hereby corrected as shown below:

In Claim 2, Column 12, Line 42, delete "based on"

In Claim 14, Column 14, Line 7, insert --,-- after "memory"

Signed and Sealed this
Fourteenth Day of November, 2017

Joseph Matal
*Performing the Functions and Duties of the
Under Secretary of Commerce for Intellectual Property and
Director of the United States Patent and Trademark Office*